US006936363B2

(12) United States Patent
Kordesch et al.

(10) Patent No.: US 6,936,363 B2
(45) Date of Patent: Aug. 30, 2005

(54) AMMONIA CRACKER FOR PRODUCTION OF HYDROGEN

(75) Inventors: Karl Kordesch, Graz (AT); Viktor Hacker, Graz (AT); Robert Fankhauser, Graz (AT); Gottfried Faleschnin, Graz (AT)

(73) Assignee: Apollo Energy Systems, Incorporated, Fort Lauderdale, FL (US)

( * ) Notice: Subject to any disclaimer, the term of this patent is extended or adjusted under 35 U.S.C. 154(b) by 30 days.

(21) Appl. No.: 10/350,364

(22) Filed: Jan. 24, 2003

(65) Prior Publication Data

US 2003/0232224 A1 Dec. 18, 2003

Related U.S. Application Data

(63) Continuation of application No. PCT/US01/41387, filed on Jul. 25, 2001.
(60) Provisional application No. 60/220,656, filed on Jul. 25, 2000.

(51) Int. Cl.[7] ............................ C01B 3/04; H01M 8/04; H01M 8/18
(52) U.S. Cl. ........................ 429/17; 423/351; 423/658.2
(58) Field of Search ............................ 423/351, 658.2; 429/17

(56) References Cited

U.S. PATENT DOCUMENTS

| 2,601,221 A | 6/1952 | Rosenblatt et al. |
| 4,360,505 A | 11/1982 | Sheridan, III et al. |
| 4,704,267 A | 11/1987 | DiMartino |
| 5,055,282 A | 10/1991 | Shikada et al. |
| 5,976,723 A | 11/1999 | Boffito et al. |
| 2005/0037244 A1 * | 2/2005 | Goetsch et al. ............... 429/17 |

FOREIGN PATENT DOCUMENTS

EP  0107 497  5/1984

OTHER PUBLICATIONS

Yang et al., "Ammonia Cracker for Fuel Cells," Analytic Power Corporation, Proceedings, 1998 Fuel Cell Seminar, Palm Springs, Nov. 16–19, 1998, pp. 294–297.
Ross, "Characteristics of an NH3—Air Fuel Cell System for Vehicular Applications," Proceedings of the 16th Intersociety Energy Conversion Engineering Conferencern Aug. 9–14, 1981, pp. 726–733.
Geissler, "Compact H2 Generators for Fuel Cells," Engelhard Industries, Inc. in 17th USA Power Sources Conference, 1963, Session on Fuel Cell Batteries, pp. 75–77, no month.
Strickland, "Hydrogen Derived From Ammonia: Small–Scale Costs," International Journal of Hydrogen Energy, vol. 9, No. 9, pp. 759–766, no month.

* cited by examiner

Primary Examiner—Wayne A. Langel
(74) Attorney, Agent, or Firm—Pillsbury Winthrop Shaw Pittman, LLP (57) ABSTRACT

This method for hydrogen production from ammonia is based on the catalytic dissociation of gaseous ammonia in a cracker. A catalytic fixed bed is used. The ammonia cracker supplies a fuel cell (for example, an alkaline fuel cell AFC) with a mixture of hydrogen and nitrogen. Most of the supplied hydrogen is burned in the ammonia cracker for the supply of the energy needed for the ammonia dissociation process.

11 Claims, 11 Drawing Sheets

BURNER TUBES

BURNER HOLES

AMMONIA CRACKER FOR PRODUCTION OF HYDROGEN

This is a Continuation of International Application No. PCT/US01/41387, which was filed on Jul. 25, 2001, and claims the benefit of U.S. Provisional Application No. 60/220,656, which was filed on Jul. 25, 2000, the contents of both of which are incorporated by reference in their entirety.

BACKGROUND OF THE INVENTION

1. Field of the Invention

The invention relates to the production of hydrogen from ammonia. The produced hydrogen is used as fuel in a fuel cell.

2. Description of Related Art

An article by G. Strickland entitled "Hydrogen Derived from Ammonia: Small-Scale Costs", Int. J. Hydrogen Energy, Vol. 9, No. 9, pp 759–766 (1984) states that hydrogen derived from anhydrous liquid $NH_3$, via a dissociator and $H_2$ purifier, offers an alternative to conventional methods of obtaining pure $H_2$ for small-scale use. The specific process outlined in the article employees a poly-bed pressure swing adsorption (PSA) system for the $H_2$ purification step. It is stated that when using this purification step in conjunction with ammonia dissociation, about 75% of the hydrogen could be recovered with a fuel credit obtained for the remainder.

European patent application No. 83306428.0 discloses a method and apparatus for the production and delivery of hydrogen, especially adapted for on-site production for hydrogen users requiring on the order of 28 to 2800 $m^3$ of hydrogen per day. According to the disclosure, hydrogen is produced by first dissociating ammonia in a typical dissociation reactor, and subsequently passing the ammonia feed stream to a bed of hydridable material which exothermically and selectively adsorbs hydrogen from the feed stream and endothermically desorbs hydrogen on demand. The $H_2$ purification hydride system comprises at least one flow through reactor having inner and outer heat exchange shells and a bed of hydridable material located co-axially there between. Additionally, a means for circulating fluid through the heat exchanger shells whereby heat may be extracted therefrom during adsorption of hydrogen from the feed and whereby heat may be supplied thereto when hydrogen is desorbed from the hydride bed. It is stated that the heat transfer characteristics of the flow-through reactor of the disclosed invention are at the heart of its performance. The heat flow is interrelated to flow rate, pressure and recovery and those variables operate to establish the effective hydrogen adsorption pressure.

Sheridan, et al. (U.S. Pat. No. 4,360,505) discloses an improved adiabatic process for separating hydrogen from mixed gas streams using hydridable materials as the adsorbing medium. The improvement involves utilizing a composite comprising a thermal ballast in admixture with the hydride material to adsorb the heat of the reaction and to aid in desorption. By virtue of the intimate contact of the ballast with the hydridable material, rapid cycle times plus good bed utilization are achieved.

Despite these advancements in the art, a need exists for an improved, efficient means of producing fuel for a fuel cell from an ammonia source.

SUMMARY OF THE INVENTION

A preferred embodiment of the invention is a process for producing a hydrogen and nitrogen mixture from gaseous ammonia, said process comprising:

(a) bypassing a gaseous ammonia stream to a dissociation unit of an ammonia cracker to dissociate the gaseous ammonia stream to a mixture of hydrogen and nitrogen at a temperature of about 500° C. to 750° C., wherein the dissociation unit consists essentially of a catalyst bed containing aluminum oxide pellets onto which an active catalyst metal has been deposited, the active catalyst metal being a member selected from the group consisting of nickel, ruthenium, platinum;

(b) supplying the hydrogen and nitrogen mixture to a fuel cell, and (c) feeding a portion of hydrogen electrode off gas to a heating unit of the ammonia cracker to supply heat for further dissociation reactions. This process may further comprise vaporizing liquid anhydrous ammonia to produce gaseous ammonia for said gaseous ammonia stream. The hydrogen and nitrogen mixture may then be supplied to an alkaline fuel cell.

In another embodiment of the invention, the process further comprises use of a heating unit comprising a catalytic burner or a lean gas combustor to convert a portion of the hydrogen electrode off gas into heat.

In another embodiment, the process further comprises use of gaseous ammonia at a pressure of up to 2 bar. According to the inventive process, dissociation of the gaseous ammonia stream in the ammonia cracker may proceed with a short start up time and low specific weight per kW of hydrogen produced.

DETAILED DESCRIPTION OF THE INVENTION

Figure 1:
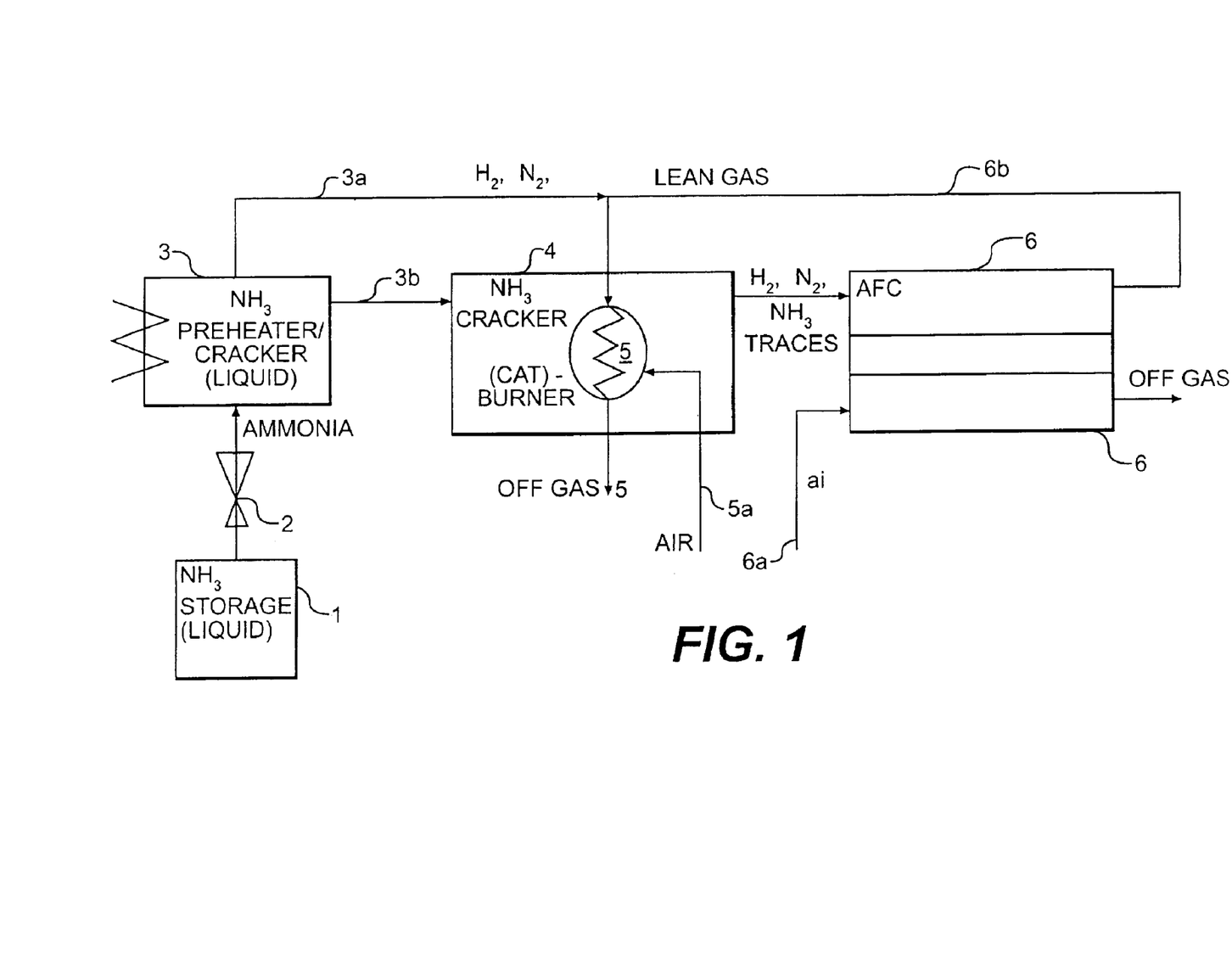
FIG. 1 shows a flow diagram of one embodiment of the invention, detailing the production of hydrogen and nitrogen from a source ammonia, which is supplied as fuel for a fuel cell.

FIG. 1 shows a flow diagram of one embodiment of the invention. Ammonia is stored in an ammonia pressure tank (1) in liquid form. The ammonia passes a pressure reducing valve (2). The gaseous ammonia passes a small ammonia cracker unit (3). This unit produces an ammonia/hydrogen/nitrogen mixture (3a) to supply the burner unit (5) of the ammonia cracker during the start up time. The small ammonia cracker unit is operated at start-up only. After start up gaseous ammonia is direct fed (3b) to the ammonia cracker (4). This unit has pre-heaters for all incoming gases (3b, 5a, 6b). Ammonia (approx. 500–650° C.) passes through the catalyst bed and is dissociated to hydrogen and nitrogen (containing traces of ammonia). This product gas is used as fuel for the fuel cell (6). The off gas from the hydrogen electrode (6b) is fed to the heating unit (5) of the ammonia cracker. The heating unit is either a lean gas combustor or a catalytic burner.

When the ammonia cracker is used in combination with an alkaline fuel cell, no additional gas purification (removal of ammonia traces) is used. For the combination of the ammonia cracker with an polymer electrolyte fuel cell PEFC, additional gas purification systems like membranes (like for hydrogen purifiers or like palladium alloy diffusion cells) or activated carbon filters are used.

When a membrane filter is used for the production of pure hydrogen, more than 95 percent of hydrogen will be used in the fuel cell. In this case the ammonia cracker is operated electrically or in a combination of electric heating and heating by the off-gas of the fuel cell.

Figure 2:
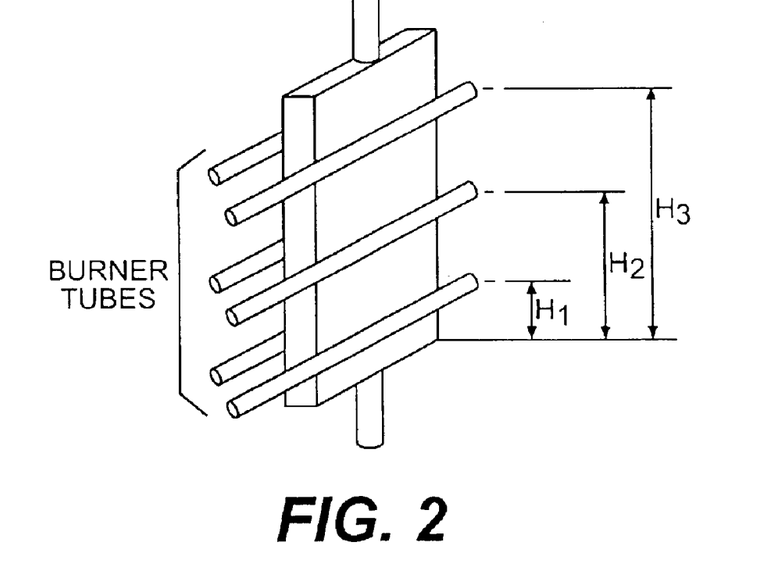
FIG. 2 is a view of a plate type cracker.
Figure 3:
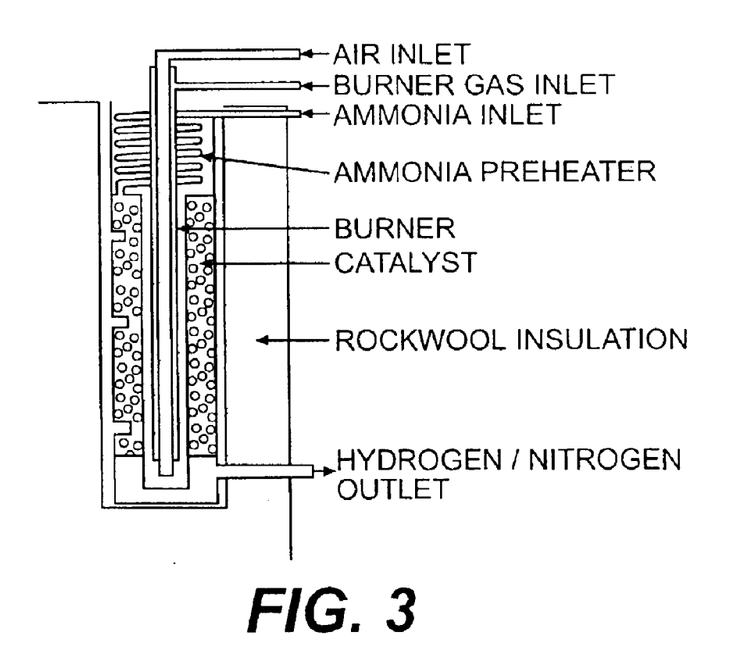
FIG. 3 is a view of a cracker having a tubular design.

FIG. 2 and FIG. 3 show two kind of cracker design, a plate type cracker and a tubular cracker. The plate type cracker (FIG. 2) has the advantages of simple design of the heated catalyst filled plates and a simplified air support system combined with an easy control system. Up-scaling is simple done by the addition of further plates. The heater tubes are easy adjustable. The tubular design (FIG. 3) suited for mass production (round simple parts, few welded joints, less thermal stress). The tubular model is especially suited for smaller applications.

Figure 7A:
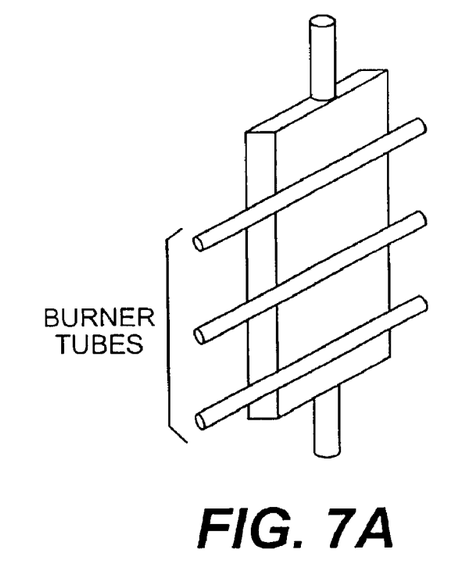
FIG. 7 is a view of a rectangular plate form cracker showing dimensions.
Figure 7B:
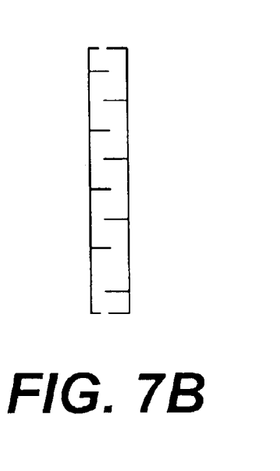

The plate type cracker has advantages over the tubular design. For a 11.5 kW ammonia cracker, the energy needed for the endothermic cracking process is approximately 3 kW. Depending on the working temperature and the efficiency of the catalyst, the amount of catalyst is in a range of 1–2 kg mass. At the given tube design of the hitherto used ammonia crackers, the air and burning gas support and the needed heat transfer to the catalyst are very difficult for this power range. The desired tube design was developed for 1 kW cracker applications. A plate form of cracker as shown in FIG. 2 and FIG. 7 overcomes the drawbacks of the crackers known in the art. Advantages of the rectangular plate form cracker include a simple design of the heated catalyst filled plates, simplified air support and easy air support control through the open bottom design, and simple up-scaling by addition of further plates. Easy visual control of test units (addition of "windows") can be achieved using this plate cracker. In addition, variable heating energy along the catalyst plates is possible due to easy variation of the heater tube positions.

Figure 8A:
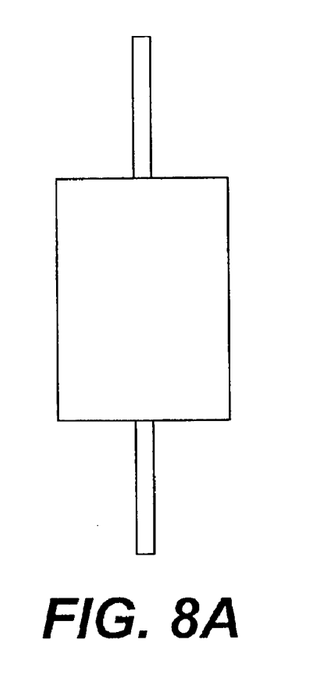
FIG. 8 shows a prototype plate cracker.
Figure 8B:
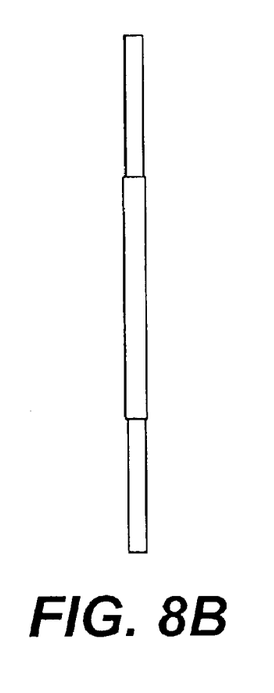
Figure 8C:
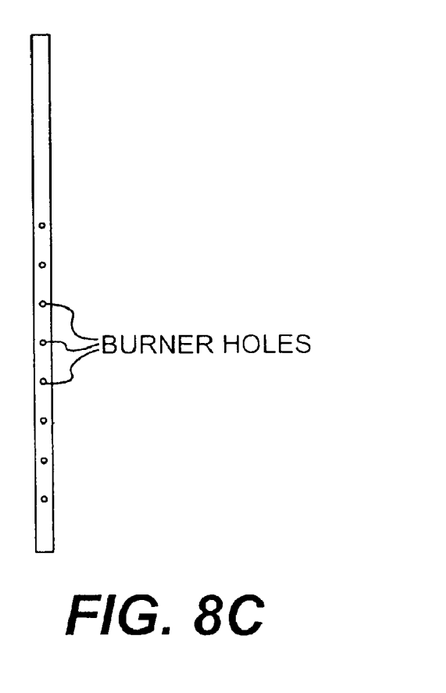

For the first test of the feasibility of this design, a test plate was manufactured to investigate the stability and the cracking efficiency of this design. The plate was manufactured from high temperature resistant 1.4842 steel and equipped with a 6 mm steel tube inside the catalyst to detect the catalyst's temperatures with thermocouples at different positions as shown in FIG. 8. This cracker test plate was heated with six burner tubes as shown in FIG. 2. The burner tubes were installed differently to find out the best position for a constant temperature at different operation conditions. For the first test burner, tubes were positioned on both sides of the cracker plate. This test plate was isolated with 4 cm rock wool isolation and the temperature profile was detected at different positions of the burner tubes. The temperatures at different heights were investigated without ammonia flow and with 400 L/hr ammonia flow to simulate an approximate 1 kW operation mode.

Figure 9:
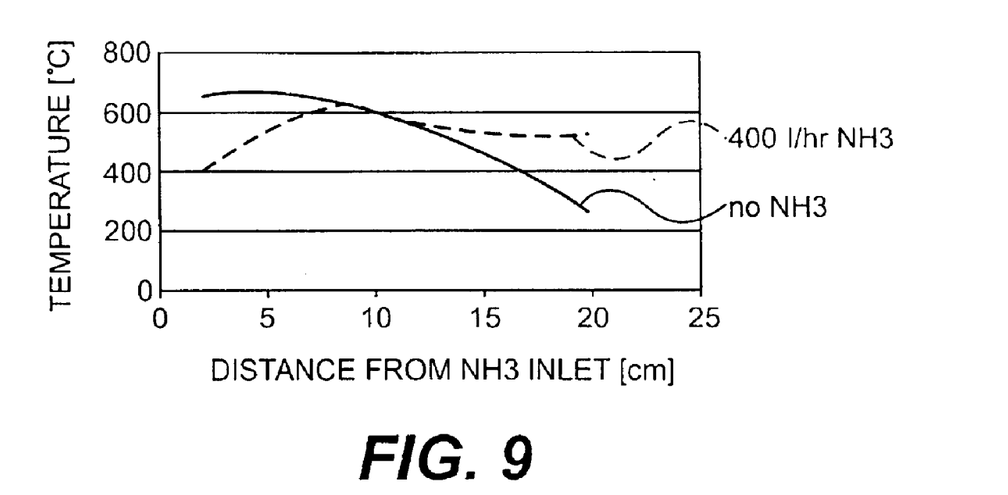
FIG. 9 graphically depicts a cracker test plate operation with non-optimized burner positioning.

The goal was to investigate the temperatures at the start up phase and at cracking operation state. FIG. 9 shows the temperature profile of the cracker test plate when the burner tubes were placed at H1-4 cm, H2-11.5 cm and H3-15.5 cm. With this burner geometry, the temperatures at the lower cracking zone were too low at the heating phase. During operation, the temperature lowers at the ammonia inlet caused by the necessary preheating of the cold ammonia.

Figure 10:
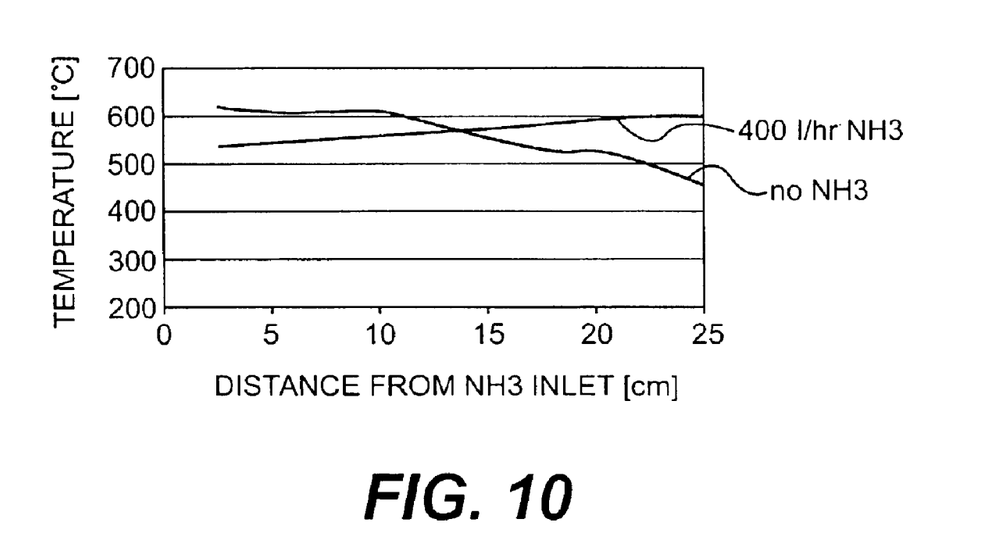
FIG. 10 graphically depicts a cracker test plate operation with a first optimized burner position.

Based on these results, the burner positions were changed. The best results were detected when the burner tubes were placed at H1 cm, H2-7.5 cm and H3-14.5 cm as shown in FIG. 10. With this burner geometry, the temperatures at an ammonia flow of 400 L/hr reached between 530° C. (upper cracker zone) and 600° C. (lower cracker zone). The low temperature at the ammonia inlet is caused by the cold ammonia as described above. For the optimal cracker design, the ammonia may be preheated by heat exchangers.

Figure 11A:
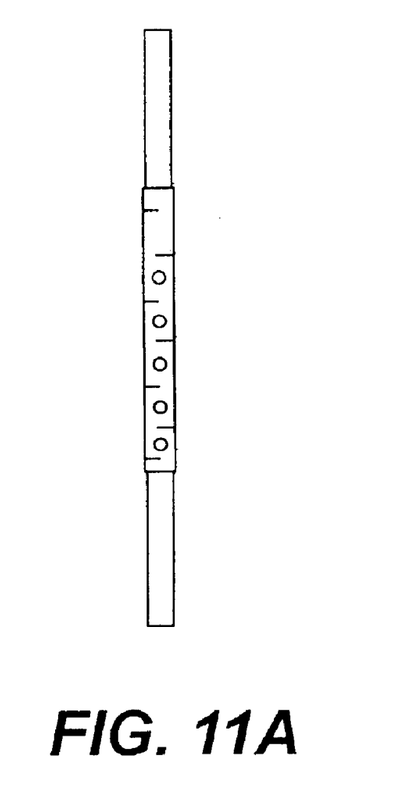
FIG. 11 is a diagram of an experimental cracker plate having several tubes fro direct positioning of thermocouples.
Figure 11B:
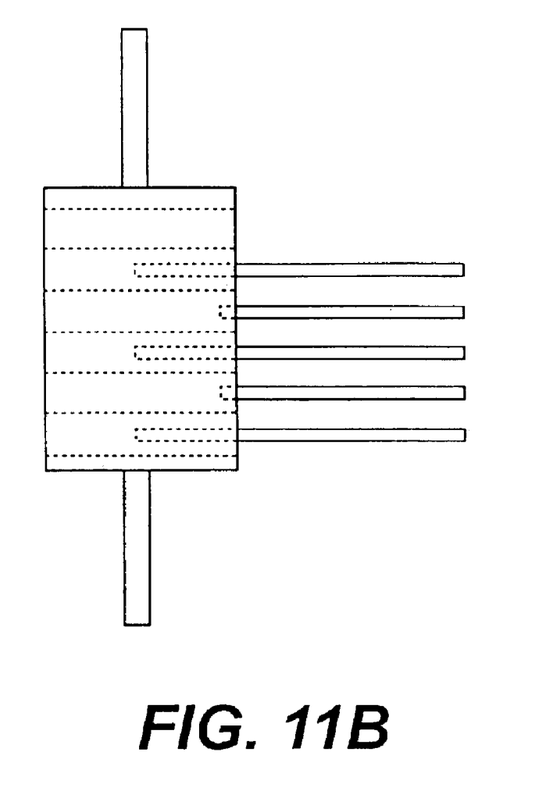
Figure 11C:
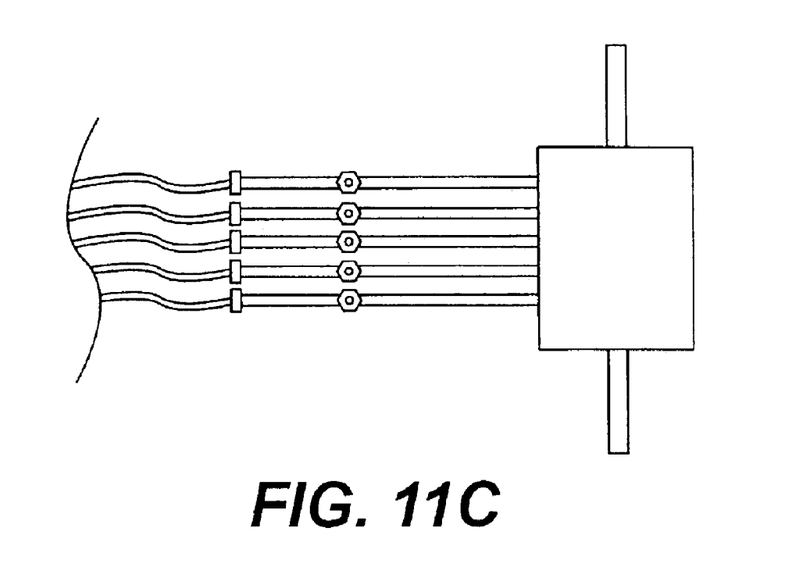
Figure 12:
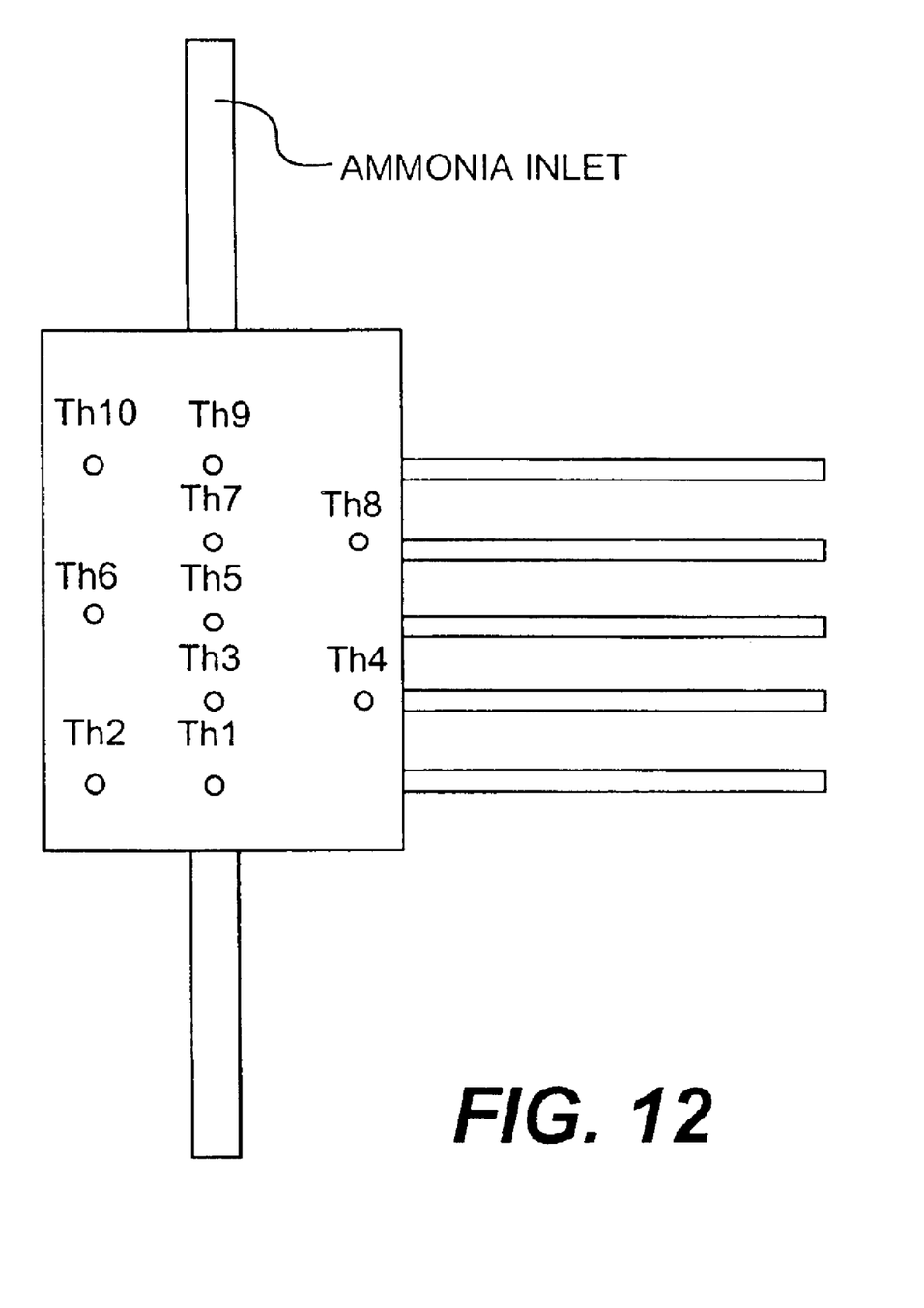
FIG. 12 is a diagram of thermocouple positions within a cracker plate.

Further testing of the plate cracker was accomplished using several tubes for positioning of thermocouples inside the catalyst. These tubes could be used for taking samples of the cracking gas composition at several positions within the cracker plate, as shown in FIG. 11. This cracker plate was equipped with 10 thermocouples at different positions as shown in FIG. 12. The cracker plate was filled with 320 ml of the catalyst. This cracker test plate was heated with six burner tubes. The position of the burner tubes were at H1-1 cm, H2–7.5 cm and H3–15.5 cm. The cracker was isolated with 8 cm rock wool isolation. No heat exchangers were used and the air flow of the burner air support needs optimization. The tests were designed to investigate the dynamic temperature changing at the start with different ammonia flow rates.

Figure 13:
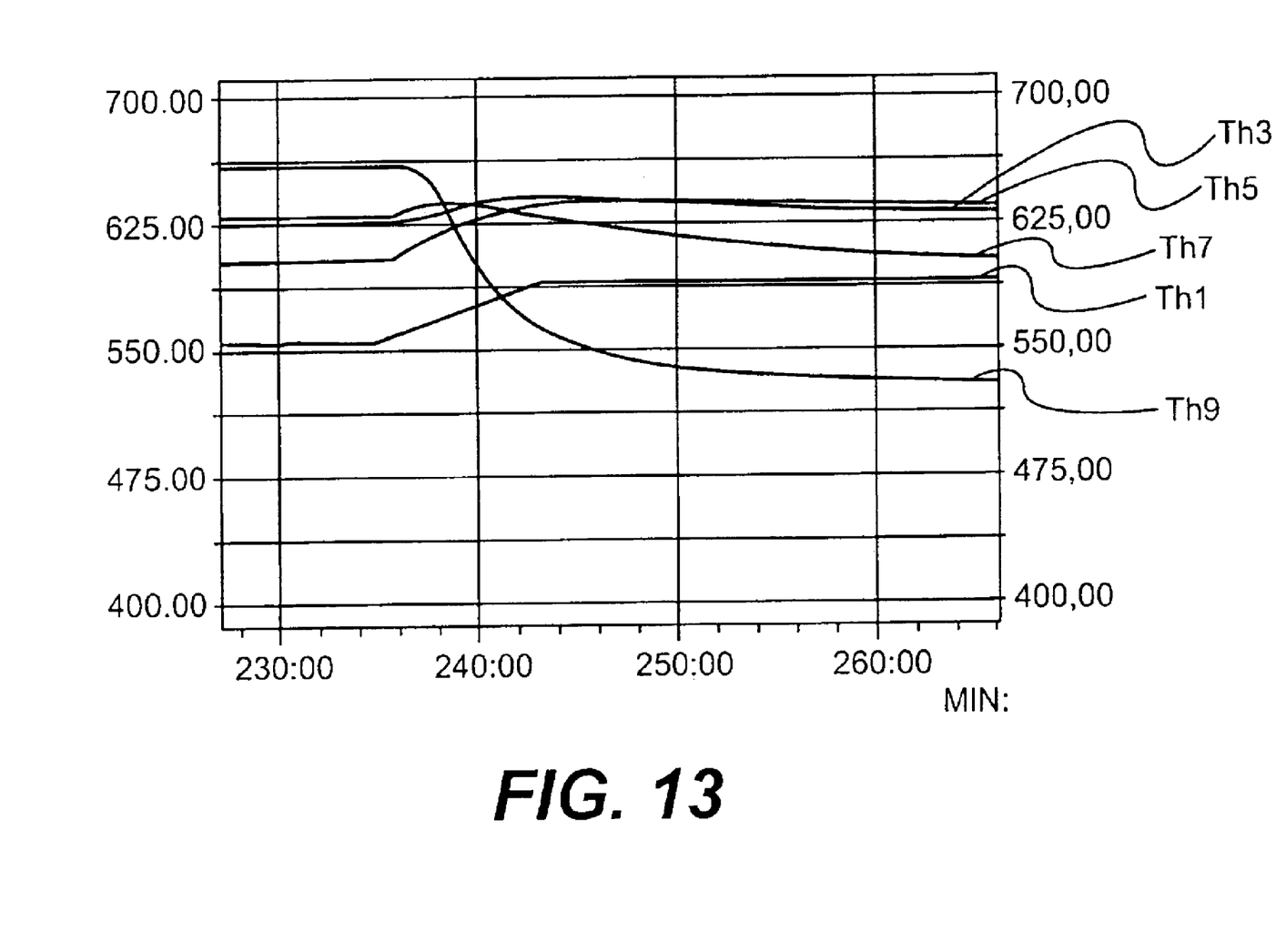
FIG. 13 graphically depicts starting temperatures at 200 L/hr ammonia flow in a cracking plate.

FIG. 13 shows the temperature changing at the vertically positioned thermocouples in the middle of the cracker (Th1, 3, 5, 7, 9) at an ammonia flow of 300 L/hr. The temperatures at the ammonia inlet reduces from 660° C. to 480° C., whereas the temperatures in the middle and lower cracker zone remain nearly constant at values of 580° C. to 630° C. At this ammonia flow rate, the temperatures in the middle and lower cracker (Th 7 to Th 1) zones were very close (590° C. to 630° C.) only the temperatures directly at the ammonia inlet (Th 9) drop too much.

Figure 14:
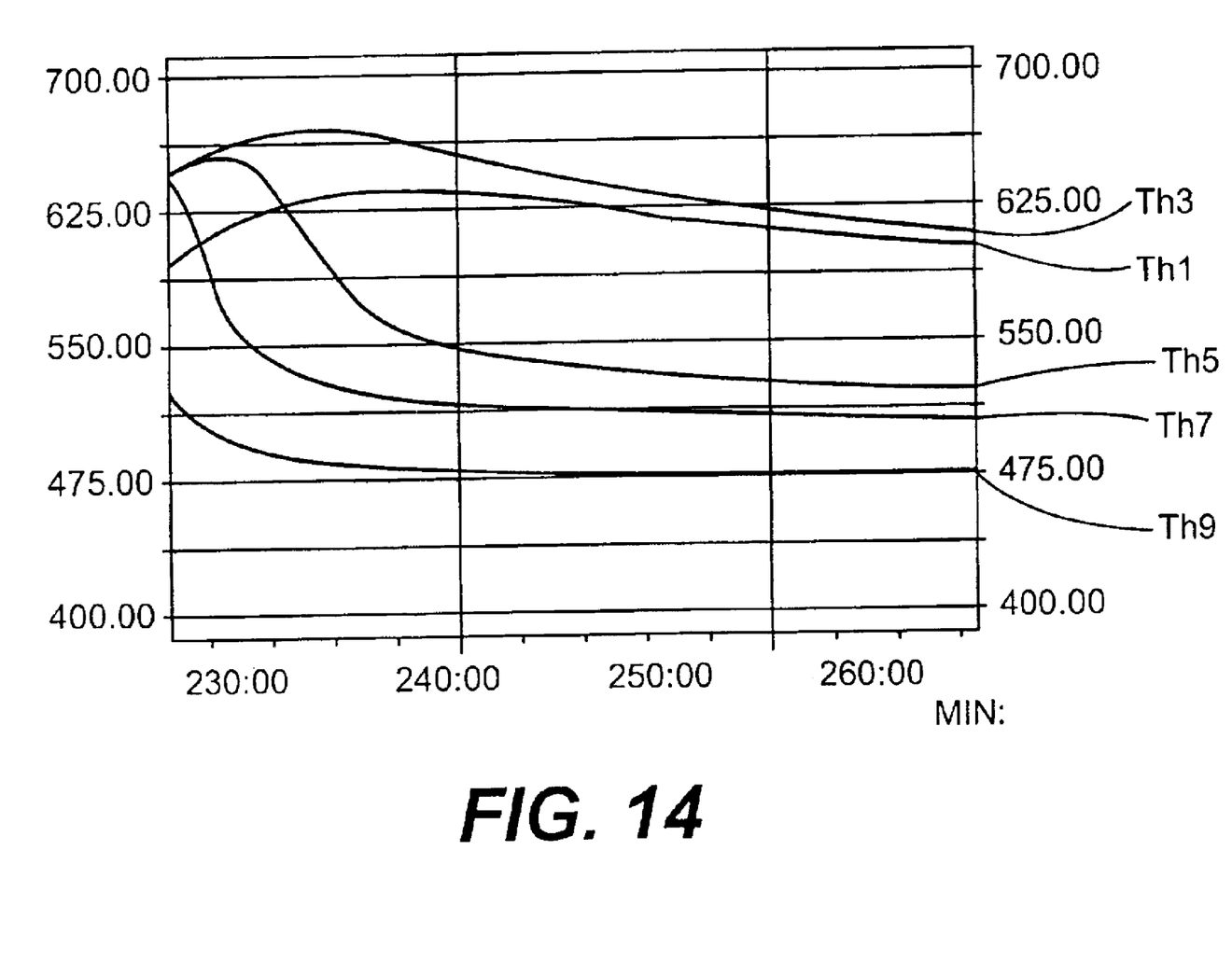
FIG. 14 graphically depicts starting temperatures at 200 L/hr ammonia flow in a cracking plate.

If the ammonia flow were raised to 800 l/hr, the temperatures would fall in all cracker zones. The effect of this ammonia flow is that the heating of ammonia to cracking temperature cools the catalyst and the cracking zone is displaced. After approximately 10 minutes, the temperatures in the upper cracker zones (Th 9, 7, 5) drop down to about 475° C. and 520° C.). The lower cracker zone remains at temperatures of 620° C. (Th 3 and 1) as seen in FIG. 14. To reduce the temperature differences between highest and lowest temperatures (620° C. and 475° C.), further investigations into the dynamic behavior with optimization and regulation of the burner are necessary. The temperature degradation noted at the ammonia inlet may be avoided via heating the ammonia with a heat exchanger.

Figure 15A:
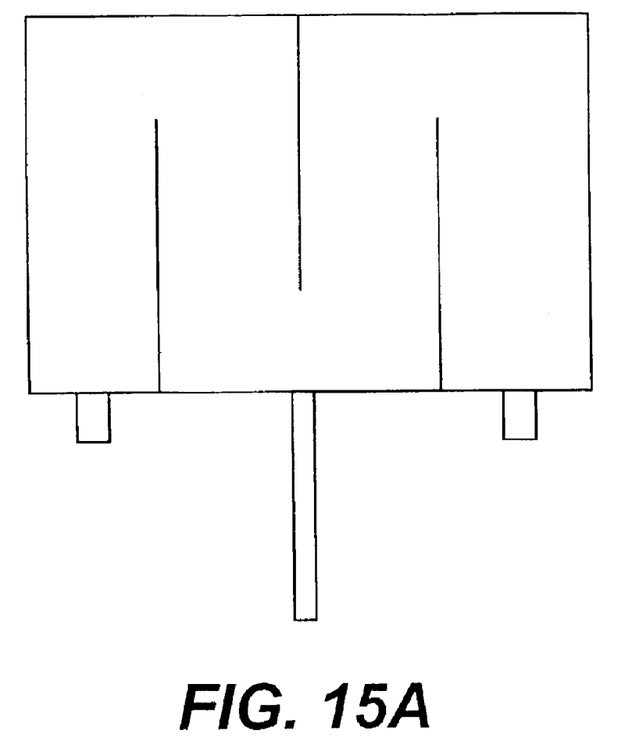
FIG. 15 is a diagram of a three plate cracker plate.
Figure 15B:
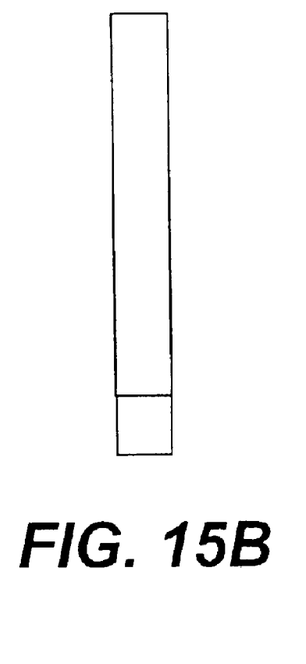

To optimize the ammonia flow inside the cracker plate, a three plate cracker was designed better control ammonia flow. Three steel plates were placed inside the cracker plate to obtain a longer flow distance as shown in FIG. 15.

Figure 4:
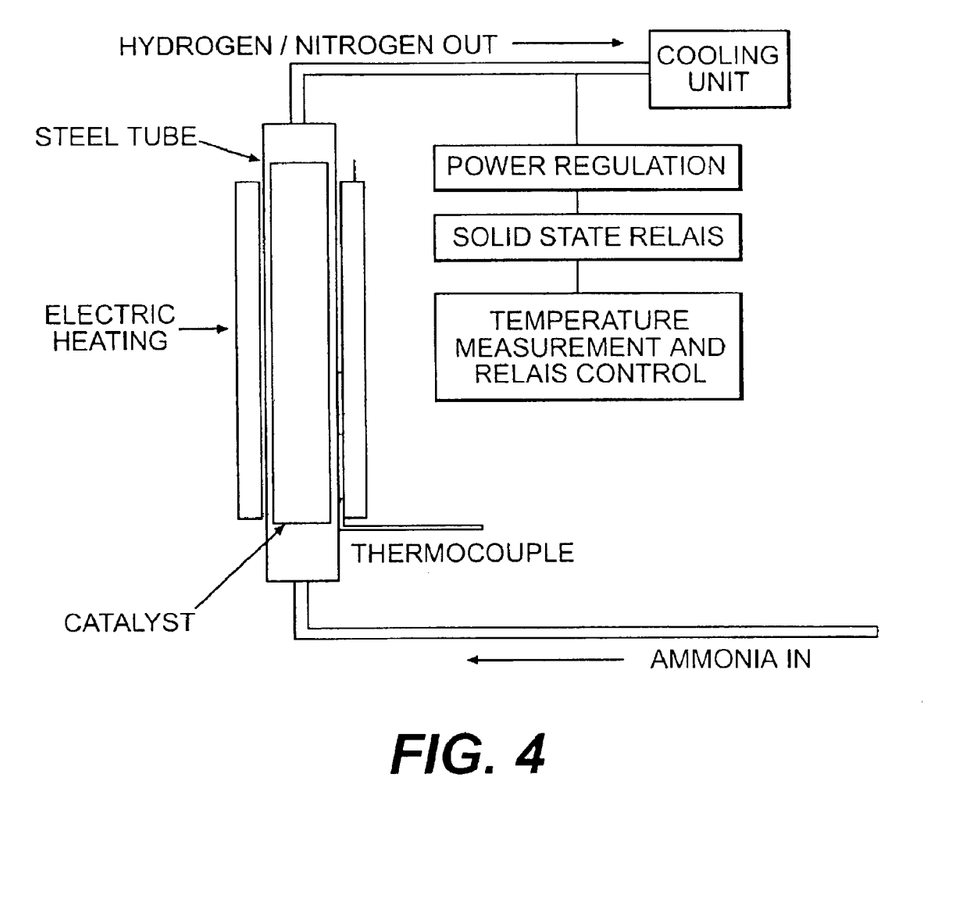
FIG. 4 is a view of an electrically heated ammonia cracker system with tubular design.

FIG. 4 shows an electrically heated ammonia cracker system with tubular design. The cracker unit is an approx. 25 cm long heat resistant steel tube. The heated zone is approx. 17 cm long. The volume for the catalyst is approximately 26 ml. An amount of 30 g Nickel/Ruthenium catalyst was used. The temperature inside the catalyst is kept constant by the control unit.

Figure 5:
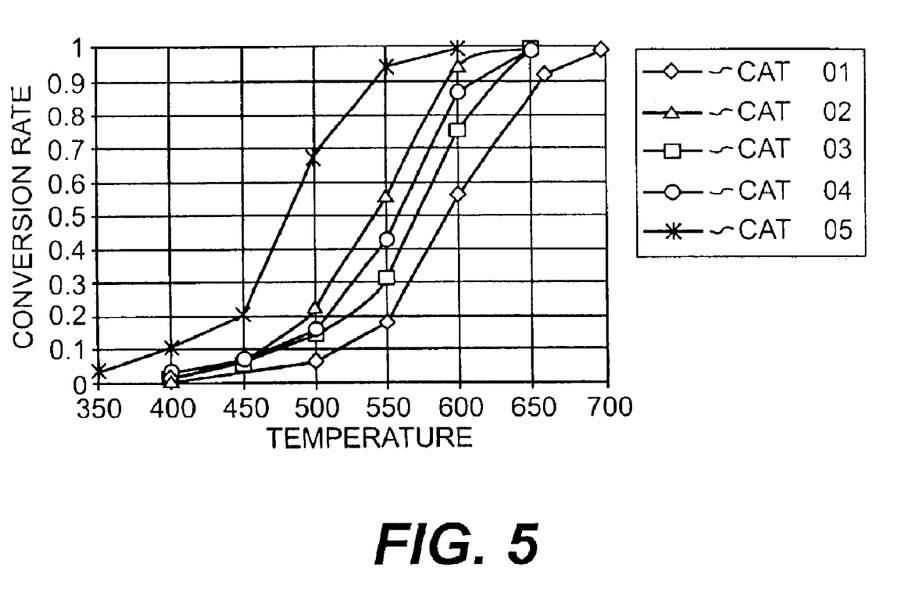
FIG. 5 graphically depicts the influence of noble metals on nickel foam.

FIG. 5 shows the conversion efficiency (from ammonia to hydrogen) for five types of catalysts (Pd/Pt/Ru/La) at different temperatures. High conversion efficiencies were reached at temperatures above 550° C.

Figure 6:
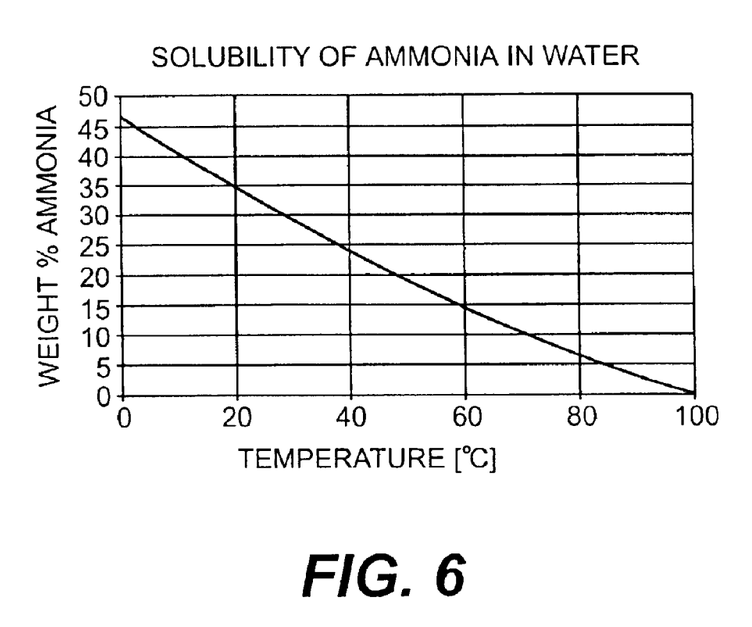
FIG. 6 graphically depicts the solubility of ammonia in water.

Analyses of the support of the fuel cell with aqueous ammonia as fuel is provided, in part, by FIG. 6. Ammonia can be stored in the form of aqueous ammonia. The solubility of ammonia in water is shown in FIG. 6. The recoverable amount of ammonia depends on the operating temperature of the ammonia degassing unit. As higher the temperature of the degassing unit, as lower is the content of ammonia in the ammonia/water mixture, that means that more ammonia can be provided for the fuel cell.

For the experiments described herein, commercially available ammonia solutions with 25 weight percent ammonia were used. At an operation temperature of 60° C. the concentration of ammonia is approximately 13%, which means that approx. 48% of the solved ammonia can be provided to the fuel cell. At an operation temperature of 80° C. the concentration of the solution is 7%, which means that 72% of the solved ammonia can be used. At higher operating temperatures more water gets vaporized. Therefore the operating temperature of the degassing unit has to be chosen considering the maximum water vapor content of the fuel for the fuel cell. For example, at 82° C. the produced fuel gas is an approx. 50/50 water/ammonia mixture.

While the invention has been described above with respect to certain embodiments thereof, it will be appreciated by one of skill in the art that variations and modifications may be made without departing from the spirit and scope of the invention.

What is claimed is:

1. A process for producing a hydrogen and nitrogen mixture from gaseous ammonia, said process comprising:
    (a) providing a gaseous ammonia stream to a dissociation unit of an ammonia cracker to dissociate the gaseous ammonia stream to a mixture of hydrogen and nitrogen at a temperature of about 500° C. to 750° C., wherein the dissociation unit consists essentially of a catalyst bed containing aluminum oxide pellets onto which an active catalyst metal has been deposited, the active catalyst metal being a member selected from the group consisting of nickel, ruthenium and platinum;
    (b) supplying the hydrogen and nitrogen mixture to a fuel cell, and
    (c) feeding a portion of hydrogen electrode off gas of the fuel cell to a heating unit of the ammonia cracker to supply heat for further dissociation reactions of the ammonia.

2. The process according to claim 1, further comprising vaporizing liquid anhydrous ammonia to produce gaseous ammonia for said gaseous ammonia stream.

3. The process according to claim 1, wherein the hydrogen and nitrogen mixture is supplied to an alkaline fuel cell.

4. The process according to claim 1, wherein the heating unit comprises a catalytic burner to convert a portion of the hydrogen electrode off gas into heat.

5. The process according to claim 1, wherein the heating unit comprises a lean gas combustor to convert a portion of the hydrogen electrode off gas into heat.

6. The process according to claim 1, wherein gaseous ammonia is used at a pressure of up to 2 bar.

7. The process according to claim 1, wherein dissociation of the gaseous ammonia stream in the ammonia cracker proceeds with a start up time and wherein the ammonia cracker is configured to operate at 1 kW.

8. The process according to claim 1 utilizing a three plate rectangular cracker having said three plates positioned within the cracker so as to control ammonia flow within the cracker.

9. The process according to claim 2, wherein the liquid anhydrous ammonia is vaporized in an ammonia preheating unit.

10. The process according to claim 9, wherein an ammonia/hydrogen/nitrogen mixture produced by said ammonia preheating unit is provided to the heating unit of the ammonia cracker during start up time.

11. The process according to claim 1, wherein said hydrogen electrode off gas is used as combustible in said heating unit to create said heat.

* * * * *

UNITED STATES PATENT AND TRADEMARK OFFICE
CERTIFICATE OF CORRECTION

PATENT NO. : 6,936,363 B2
DATED : August 30, 2005
INVENTOR(S) : Kordesch et al.

It is certified that error appears in the above-identified patent and that said Letters Patent is hereby corrected as shown below:

<u>Title page,</u>
Item [75], Inventors, "Gottfried Faleschnin" to -- Gottfried Faleschini --.
Item [56], References Cited, OTHER PUBLICATIONS, "Ross" reference, change "Conferencem" to -- Conference --.

Signed and Sealed this

Eleventh Day of April, 2006

JON W. DUDAS
*Director of the United States Patent and Trademark Office*